(12) United States Patent
Karassiouk et al.

(10) Patent No.: US 10,761,399 B2
(45) Date of Patent: Sep. 1, 2020

(54) LASER EXPOSURE HEAD WITH REDUCED LEAKAGE

(71) Applicant: Eastman Kodak Company, Rochester, NY (US)

(72) Inventors: Valentine A. Karassiouk, Vancouver (CA); Nissim Pilossof, Burnaby (CA)

(73) Assignee: EASTMAN KODAK COMPANY, Rochester, NY (US)

( * ) Notice: Subject to any disclaimer, the term of this patent is extended or adjusted under 35 U.S.C. 154(b) by 218 days.

(21) Appl. No.: 16/045,864

(22) Filed: Jul. 26, 2018

(65) Prior Publication Data

US 2020/0033695 A1 Jan. 30, 2020

(51) Int. Cl.
*G02F 1/29* (2006.01)
*G02F 1/03* (2006.01)
*G02F 1/07* (2006.01)
*G02F 1/315* (2006.01)
*B41J 2/44* (2006.01)
(Continued)

(52) U.S. Cl.
CPC .............. *G02F 1/315* (2013.01); *B41J 2/442* (2013.01); *G02B 5/005* (2013.01); *G02B 27/283* (2013.01); *G02F 2201/305* (2013.01)

(58) Field of Classification Search
CPC ............ G02B 6/12019; G02B 6/12011; G02B 6/12016; G02B 6/12023; G02B 2006/12097; G02B 2006/12176; G02B 6/132; G02B 6/42; G02B 6/12004; G02B 6/29317; G02B 6/12036; G02B 6/4249; G02B 6/43; G02B 2006/12107; G02B 6/02061; G02B 6/34; G02B 6/12033; G02B 6/2813; G02B 6/293; G02B 6/29338; G02B 6/29352; G02B 6/29395; G02B 6/12007; G02B 6/12009; G02B 6/29308; G02B 6/2931; G02B 27/283; G02B 5/005; G02B 6/00; G02B 6/02204; G02B 6/12028; G02B 6/124; G02B 6/136; G02B 6/4215; G02F 2201/346; G02F 1/03; G02F 1/0121; G02F 1/29; G02F 1/315; G02F 1/3558; G02F 1/3775; G02F 2001/3546;
(Continued)

(56) References Cited

U.S. PATENT DOCUMENTS

4,281,904 A 8/1981 Sprague et al.
4,376,568 A 3/1983 Sprague
(Continued)

*Primary Examiner* — Brandi N Thomas
(74) *Attorney, Agent, or Firm* — Kevin E. Spaulding (57) ABSTRACT

A laser exposure system includes an electrically-controlled diffraction grating which can be controlled to be in a first state where the incident light beam is undiffracted and a second state where the incident light beam is diffracted into a plurality of light beams including a zero-order light beam and first and second diffracted light beams. An aperture structure which passes the first and second diffracted light beams while blocking the zero-order light beam. A polarization rotator rotates a polarization state of the second diffracted light, and a polarization beam combiner combines the first diffracted light beam and the polarization-rotated second diffracted light beam onto a common path forming a combined light beam. An optical element focuses the combined light beam onto an imaging medium. A controller controls the state of the electrically-controlled diffraction grating in accordance with pixel data to form a printed image.

9 Claims, 5 Drawing Sheets

(51) Int. Cl.
 *G02B 5/00* (2006.01)
 *G02B 27/28* (2006.01)
(58) Field of Classification Search
 CPC ....... G02F 2001/3548; G02F 2201/305; G02F 2202/20; G02F 1/153; G02F 1/1533
 USPC ......... 359/315, 318–321, 237–238, 242–247
 See application file for complete search history.

(56) References Cited

U.S. PATENT DOCUMENTS

| | | | |
|---|---|---|---|
| 4,786,918 | A | 11/1988 | Thornton et al. |
| 4,804,975 | A | 2/1989 | Yip |
| 4,900,130 | A | 2/1990 | Haas |
| 5,351,617 | A | 10/1994 | Williams et al. |
| 5,517,359 | A | 5/1996 | Gelbart |
| 5,521,748 | A | 5/1996 | Sarraf |
| 5,619,245 | A | 4/1997 | Kessler et al. |
| 5,923,475 | A | 7/1999 | Kurtz et al. |
| 6,169,565 | B1 | 1/2001 | Ramanujan et al. |
| 6,211,997 | B1 | 4/2001 | Nutt et al. |
| 8,023,170 | B1 | 9/2011 | Ko et al. |
| 2015/0301491 | A1* | 10/2015 | Yoshikawa ........ G03G 15/6564 271/3.16 |

* cited by examiner

LASER EXPOSURE HEAD WITH REDUCED LEAKAGE

FIELD OF THE INVENTION

This invention pertains to the field of laser printers, and more particularly to laser exposure heads using electro-optic spatial light modulators.

BACKGROUND OF THE INVENTION

Laser printers, particularly flying spot printers, are used in a wide variety of applications, from office printing, to medical printing, to bar code printing. These systems typically print with a single lower power beam, onto fairly sensitive media. Other systems, such as those used in the graphic arts industry, often are configured as multispot printers to attain sufficient productivity. As many types of graphic arts media are rather insensitive to light exposure, each of these incident beams must provide a high light level in a small spot at the printing plane. Such printers are typically configured like a "lathe," where the page scan is obtained by rotating a drum which holds the media, and the line scan is obtained by translating the multiple laser beams in a direction parallel to the axis of rotation of the drum.

There are several approaches to solving the graphic arts printer design problem. In one approach, a set of laser sources are separately coupled to optical fibers, which are then mounted to form a linear array of sources. Each of these channels can then be independently modulated. Examples of such systems are described in commonly-assigned U.S. Pat. No. 4,900,130 to Haas, entitled "Method of scanning," and U.S. Pat. No. 5,351,617 to Williams et al., entitled "Method for laser-discharge imaging a printing plate." Another approach is to utilize a monolithic array of laser sources and then image the elements of the laser array directly onto the light sensitive media to produce multiple spots. Power to each element of the laser array is individually modulated to obtain pixel densities. Such a system, described in commonly-assigned U.S. Pat. No. 4,804,975 to Yip, entitled "Thermal dye transfer apparatus using semiconductor diode laser arrays," is potentially of lower cost and higher efficiency as compared to systems which couple the lasers to optical fibers. However, these systems are significantly disadvantaged as the failure of even one lasing element or emitter of the laser diode array source will appear as an artifact in the printed image, requiring replacement of the entire laser array source.

One approach to improving a printing system using a monolithic diode array source is to split each lasing element or emitter into an array of subarray sources, such as described in commonly-assigned U.S. Pat. No. 5,619,245 to Kessler et al., entitled "Multi-beam optical system using lenslet arrays in laser multi-beam printers and recorders." Each writing element is assembled from the combined light of all the lasing elements or emitters of a given subarray, and each of the subarrays are directly and individually modulated to provide the image data output. This approach desensitizes the system to the failure of the lasing elements or emitters within a subarray.

Another approach to improving a system with a monolithic diode array source is to combine the light from each lasing element or emitter to flood illuminate a linear spatial light modulator array. The pixel elements of the modulator break up the light into image elements, and each pixel of the modulator is subsequently imaged onto the media plane to form the desired array of printing spots. Printing systems employing this approach are described in U.S. Pat. No. 4,786,918 to Thornton et al., entitled "Incoherent, optically uncoupled laser arrays for electro-optic line modulators and line printers;" commonly-assigned U.S. Pat. No. 5,517,359 to Gelbart, entitled "Apparatus for imaging light from a laser diode onto a multi-channel linear light valve;" and commonly-assigned U.S. Pat. No. 5,521,748 to Sarraf, entitled "Light modulator with a laser or laser array for exposing image data." These systems improve upon the prior art designs by providing indirect light modulation means, so that the laser diode array operates at full power, and serves only as a light source. Also, as the light from the emitters overlaps in illuminating the modulator, the resulting redundancy desensitizes the system to the failure or poor behavior of any of the lasing elements or emitters within the array.

The performance of such systems, in which a linear spatial light modulator array is flood illuminated, is highly dependent on both the design of the illumination system and the design and operation of the modulator array. Optimally, the illumination system should provide highly uniform illumination with minimal loss of brightness. In U.S. Pat. No. 4,786,918, the Gaussian beams from many single mode lasers are combined in the far field to create a broad and generally slowly varying illumination profile, but one which still falls off in a generally Gaussian manner. The array of single mode lasers is carefully structured so that the beams from the individual laser sources are mutually incoherent, and therefore they can be superimposed without interference. Such a structure may provide the effect required of a relatively incoherent source that may be used in conjunction with a spatial light modulator. However, great care needs to be taken to guarantee that the source does not exhibit any phase locking, or coherence effects. Additionally, the modulator will require extremely uniform illumination in order to avoid streaking in the images. While this may be achievable within the constraints shown in U.S. Pat. No. 4,786,918, the care, detail and effort required may render the system expensive and difficult to maintain in a manufacturing environment.

U.S. Pat. No. 5,517,359 provides for a printing system with a laser diode array consisting of multimode emitters, each of which typically has a rather non-uniform near field profile. A mirror system, included in the illumination optics, partially improves the light uniformity by substantially removing the macro-nonuniformities in the light profile. Another method, as described in commonly-assigned U.S. Pat. No. 5,923,475 to Kurtz et al., entitled "Laser printer using a fly's eye integrator," uses a laser diode array including multimode emitters, but with an illumination system utilizing a fly's eye integrator. With the fly's eye integrator, both the micro and macro light non-uniformity can be substantially improved.

Given that the illumination optics efficiently provides a uniform illumination of the linear spatial light modulator, the overall system performance is highly dependent on the design and operation of the spatial light modulator array. Generally, candidate technologies for a spatial light modulator to be used in a laser printer for graphic arts should be highly transmissive with a high optical fill factor, have high thresholds for optical damage and altered behavior under exposure to high optical energy densities, and provide sufficiently high modulation contrast at high data rates. There are both electromechanical and electro-optical modulator technologies which meet these various criteria for use in a laser thermal printer.

Total-internal-reflection (TIR) modulators, as described in U.S. Pat. No. 4,281,904 to Sprague et al., entitled "TIR electro-optic modulator with individual addressed electrodes," and U.S. Pat. No. 4,376,568 to Sprague et al., entitled "Thick film line modulator," which are of the electro-optic variety, have many traits which lend themselves to use in a laser thermal printer. Such devices are transmissive modulators used with schlieren optics, produced from ferroelectric crystals, which can be designed for a high optical fill factor. Useful materials are preferably highly transmissive in the near infrared, and have a high threshold to optical damage. Furthermore, the TIR modulator, as described by U.S. Pat. No. 4,376,568, is a device which modulates the light by imposing a grating structure on it when an electric field is applied. As a result the light is diffracted, and the modulated light is separated from the unmodulated light by spatial filtering at a Fourier plane later in the optical system. As the TIR modulator uses schleiren phase modulation, as opposed to directly absorbing or blocking the light, the thermal load on the modulator is greatly reduced. These TIR modulators perform admirably when illuminated by light from a highly coherent source. However, the high-power laser sources needed for laser thermal printing applications are at best partially coherent.

U.S. Pat. No. 6,169,565 to Ramanujan et al., entitled "Laser printer utilizing a spatial light modulator," describes a laser printer utilizing a TIR spatial light modulator that is optimized to work with a partially coherent laser source. The laser source is a laser diode array having a plurality of multi-mode emitters. The spatial light modulator uses an electrically-controlled phase grating that diffracts light from the laser source according to an applied electric field. A spatial filter having a slit passes undiffracted light which is ultimately imaged onto an image plane by way of an imaging lens. When a pixel is in an "on" state, no voltage is supplied to the spatial light modulator so that the light beam passes undiffracted and is imaged onto the image plane. When a pixel is in an "off" state, a voltage is applied to the light valve channel, forming a grating which diffracts the light beam so that it does not pass through the slit. However, a small fraction of the beam energy still passes through the light valve without deflection (i.e., in the zero diffraction order), and is therefore imaged onto the image plane. Such light is commonly called "leakage." Leakage is measured as a percentage of the optical power that reaches the image plane in the "off" state relative to that in the "on" state. It has been found that the leakage magnitude depends on the period of the phase grating and is stronger for smaller grating periods. Reduction of grating period allows improvement of the resolution and an increase of the number of pixels while using crystal of the same size. However, experience shows that reduction of grating period in TIR modulators leads to increase of leakage to levels greater than 5%. Such leakage levels would create unacceptable artifacts in many applications.

There remains a need for a laser exposure head using a TIR spatial light modulator having an improved level of leakage.

SUMMARY OF THE INVENTION

The present invention represents a laser exposure system, includes:

an electro-optic substrate including an electrically-controlled diffraction grating having a controllable state;

a laser source directing an incident light beam into the electro-optic substrate, wherein when the electrically-controlled diffraction grating is controlled to be in a first state the incident light beam passes through the electro-optic substrate without diffraction providing an undiffracted light beam, and wherein when the electrically-controlled diffraction grating is controlled to be in a second state the incident light beam is diffracted into a plurality of light beams corresponding to different diffraction orders, the plurality of light beams including a zero-order light beam corresponding to a zero diffraction order, and first and second diffracted light beams corresponding to diffraction orders of −n and +n;

an aperture structure including first and second apertures positioned such that the first diffracted light beam passes through the first aperture and the second diffracted light beam passes through the second aperture, wherein the aperture plate blocks the undiffracted light beam when the electrically-controlled diffraction grating is in the first state and blocks the zero-order light beam when the electrically-controlled diffraction grating is in the second state;

a polarization rotator which rotates a polarization state of the second diffracted light beam to provide a polarization-rotated second diffracted light beam;

a polarization beam combiner which combines the first diffracted light beam and the polarization-rotated second diffracted light beam onto a common path forming a combined light beam;

an optical element which focuses the combined light beam onto an imaging medium; and a controller which controls the state of the electrically-controlled diffraction grating in accordance with pixel data.

This invention has the advantage that it provides an output light beam having a reduced level of leakage relative to prior art configurations that utilize the undiffracted light beam as the imaging light.

It has the additional advantage that it provides an output light beam having an increased power level relative to prior art systems that utilize a single diffracted order to provide the imaging light.

It has the further advantage that it provides an output light beam having an increased depth of focus relative to prior art systems that combine multiple diffraction orders to provide the imaging light.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
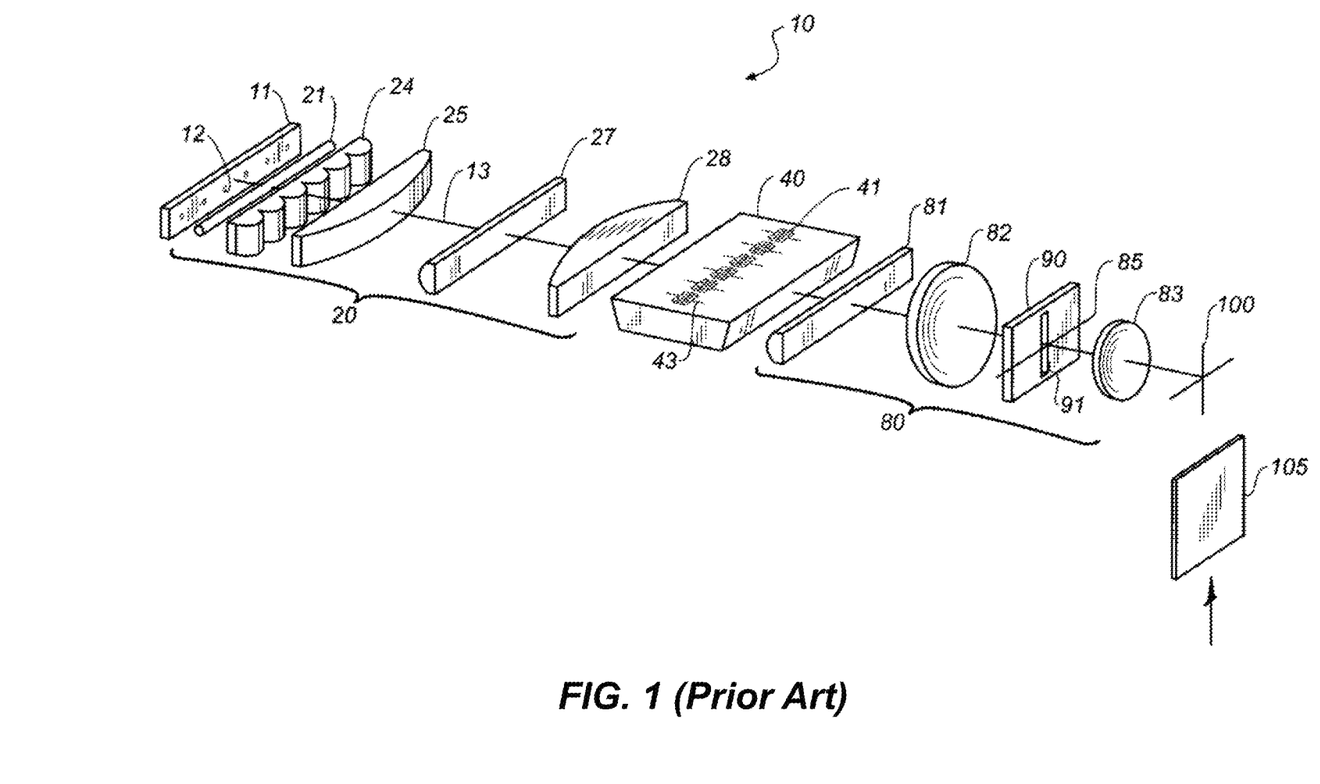
FIG. 1 is a perspective view of a prior art laser printer.

FIG. 1 illustrates an exemplary laser exposure system 10 (i.e., a laser printer) as described in commonly-assigned U.S. Pat. No. 6,169,565 to Ramanujan et al., entitled "Laser printer utilizing a spatial light modulator," which is incorporated herein by reference. Laser exposure system 10 includes a laser diode array 11, illumination optics 20 with optical axis 13, a total internal reflecting (TIR) modulator array 40 having modulator pixels 41, a print lens 80, and a receiver medium 105 (also referred to as an imaging medium), located at an image plane 100 (also referred to as a media plane).

The laser diode array 11 includes a high power array of laser sources, comprising a row of multi-mode laser diode emitters 12 oriented in a nominally linear fashion across an exit facet. Laser diode emitters 12 of laser diode array 11 are each activated simultaneously using a common power supply (not shown) in a continuous wave (CW) manner. The use of a CW laser without individual modulation simplifies the laser power supply and the heat dissipation system.

All laser diode emitters 12 of the laser diode array 11, in combination with illumination optics 20, illuminate a line or area of specified size at TIR modulator array 40. In particular, the light from each laser diode emitter 12 is mapped by illumination optics 20 to cover the full width of TIR modulator array 40, thereby providing source redundancy, and reducing the sensitivity of the system to the malfunction of any one laser diode emitter 12.

The illumination optics 20 are shown with separate anamorphic optical elements designed for the array and cross-array directions, which is convenient as the light output by laser diode emitters 12 has vastly different characteristics in the two directions. It should be understood that in other embodiments some axially symmetrical components, with power in both directions could also be used. The cross-array elements of illumination optics 20 comprises fiber lens 21 and a cross-array lens 27, which are designed to transfer the light from laser diode array 11 to TIR modulator array 40 in such a fashion that light incident within the region of modulation is confined within a vertical width of active modulator pixels 41. Typically, the cross-array optics image laser diode emitters 12 to a TIR modulator array 40. In order to control the image width and numerical aperture (NA) of the beam at the TIR modulator array 40, the cross-array optics can include means (not shown) for correcting cross-array smile error of the laser diode array 11. The effects of smile error can also be mitigated by imaging the fiber lens 21, or its back focal plane, rather than laser diode emitters 12, onto the TIR modulator array 40. Fiber lens 21 can, for example, be a gradient index cylindrical microlens from Doric Lenses Inc. of Ancienne-Lorette, Quebec, or a hyperbolic cylindrical microlens from Blue Sky Research of San Jose Calif. It should be understood that the cross-array optical system used to illuminate the TIR modulator array 40 may include more lens elements than just those shown if FIG. 1.

Illumination optics 20 also comprises the array-direction optics, which in the configuration of FIG. 1 a laser lenslet array 24, a combiner field lens 25, and a field lens 28. When properly aligned, any given lenslet of laser lenslet array 24 will work in cooperation with combiner field lens 25 to image the laser diode emitter 12 which corresponds to that lenslet onto TIR modulator array 40. In like fashion, each laser diode emitter 12 is imaged onto TIR modulator array 40, with these multitude images being overlapped onto each other by combiner field lens 25. Laser lenslet array 24 and combiner field lens 25 can be manufactured as one integrated lens element, rather than as the two separate elements shown in FIG. 1. The array-direction illumination optics can also include a variety of other elements (not shown), including fly's eye integrators, integrating bars, or mirrors recombiners, so as to improve the uniformity of the array-direction illumination on the TIR modulator array 40.

Working together, the array and cross-array optics flood illuminate the TIR modulator array 40 with a long, narrow, line of light of sufficiently uniform radiance, while largely preserving the brightness of laser diode array 11 (less transmission and other losses) and providing redundancy relative to laser diode emitters 12. In particular, this anamorphic line of illumination extends the full length of TIR modulator array 40 in the array direction, while illuminating a narrow width in the cross-array direction, roughly equivalent to the active width (electric field depth) of modulator pixels 41.

The TIR modulator array 40 is then imaged to image plane 100 by print lens 80 to create a line of closely packed writing spots on the receiver medium 105. Print lens 80 is typically a multi-element assembly, which may either be axially symmetric or anamorphic. For simplicity, print lens 80 of FIG. 1 is shown with three print lens elements 81, 82, 83. Print lens element 82 acts as a field lens to condense light within the clear aperture of print lens element 83. Print lens element 82 also creates a Fourier plane 85 at an aperture stop, where a spatial filter 90 is located. Spatial filter 90 may include a simple slit 91, as shown in FIG. 1, which passes the undiffracted light. In the circumstance where receiver medium 105 is relatively light insensitive, such that the light level threshold required to achieve printing is very high, a central opening is preferred as optical transmission is maximized. Spatial filter 90 can be planar as shown, or can be made along an arc or spherical shape, to match the non-paraxial shape of the aperture stop, thereby optimizing contrast. Print lens element 83 then completes the process of imaging TIR modulator array 40 to image plane 100. Print lens element 81 is an optional cylindrical lens element, which if used, alters the magnification of print lens 80, such that the array and cross-array directions are no longer magnified identically. Print lens 80 is thus anamorphic, or asymmetrical in function. This refinement may be employed if the aspect ratio of the light beam (width to height) at a pixel 41 is not identical to the desired aspect ratio of the imaged pixel at image plane 100. It should be understood that cylindrical print lens element 81 can in actuality be one or more lens elements. Likewise, print lens elements 82, 83 are both also shown as one element each for simplicity, but each may comprise multiple lens elements.

As the light emitted from these diode laser arrays typically has a bandwidth ($\Delta\lambda$) of ~3-4 nm, the coherence length $L=\lambda^2/\Delta\lambda \approx 0.2$ mm. The coherence width (also known as coherence interval) in the array direction can be estimated as $D=(2\times0.16\times\lambda/NA)\approx 2$ µm, which is small compared to the 150 µm array-direction width of any one laser diode emitter 12 of laser diode array 11. Thus, the light emitted in the array direction from a laser diode emitter 12, provided that the lasing structure is multimode, is minimally spatially coherent across laser diode emitter 12. As a result, the overall array-direction profile of light from a laser diode emitter has minimal rippling from intra-emitter interference.

By maintaining the multimode, incoherent relationship between adjacent laser diode emitters 12, laser diode array 11 can provide illumination relatively free from filamentation effects typical of broad area or purely gain guided devices. The presence of individual laser diode emitters in the chosen laser diode array reduces the periodicity of any spatial substructure that may arise. Filamentation, which really only occurs within the substructure of an individual laser diode emitter, is minimal and need not in any way correlate to the adjacent laser diode emitter. Because laser diode array 11 is multi-element and less prone to filamentation effects at the required operation current, such a laser diode array can produce much higher output power levels while maintaining a spatially and temporally stable beam. Furthermore, the individual laser diode emitters 12 are sufficiently spaced as to be unlikely to display any phase coupling behavior. Consequently, interference effects that create and destroy modal structures and provide a nonuniform beam are avoided.

Another advantage of the relative incoherence of adjacent multi-mode laser diode emitters 12 is the temporal stability of the laser diode array 11. Uncoupled, incoherent laser diode emitters 12 generally do not exhibit the periodic, and quasi-periodic temporal behavior that has been observed in many other high power laser diode arrays.

Furthermore, the chosen laser diode array 11 greatly simplifies the optical design of the rest of the printing system. By using a laser diode array 11 with a series of colinearly positioned laser diode emitters 12, each providing light that is flat-topped and incoherent in the array direction, the optics to overlap and position light onto modulator array 40 are relatively simple. By comparison, the laser structure required by the arrangement of U.S. Pat. No. 4,786,918 is two dimensional, as the emitters are located in two parallel rows along the front face of the device. This structure effectively increases the cross-array source Lagrange, and therefore the NA at the modulator is increased as well. Alternately, this problem can be compensated using polarization or beam shifting optics, but the optical system would be more complicated and difficult to align than that of FIG. 1. Finally, for the system of FIG. 1, the interaction distance within spatial light modulator array 40 is determined by modulator array 40 and not by the width and coherence of the illumination. For this reason, the difficulty of modulator fabrication is reduced. Also, single pixel modulation depth at modulator array 40 need not be as rigidly controlled, and modulation uniformity can be achieved by groupings of pixels as opposed to on a single pixel basis.

Referring back to the cross-array direction, the cross-array direction coherence width is larger than the cross-array direction 1/e2 emitting width of a laser diode emitter 12, which can be estimated as $H=2\times\lambda/(\pi\times NA)=0.85$ μm. Thus, light from any laser diode emitter 12 of laser diode array 11 is spatially coherent in the cross-array direction. Again, the multitude of laser diode emitters 12 across laser diode array 11 are not phase coupled with one another. Therefore, the light from the multitude of laser diode emitters 12 can be combined at TIR modulator array 40 without interference and resulting rippling in the irradiance profile. It is the minimal coherence in the array direction coupled with the coherence of the cross-array direction that allows the use of the TIR modulator array 40 in this application. Without the uniqueness of the optical design used in conjunction with a very specific TIR spatial light modulator design, the required light transmission at intensities of tens of Watts with sufficient contrast would be unattainable.

While array-direction light from any one emitter is incoherent enough that filamentation is not significantly in evidence, and is incoherent enough that light from any one emitter can be overlapped with itself (such as by a fly's eye integrator) without significant interference effects, the light is coherent enough to be effected in a useful fashion by TIR modulator 40. In particular, when the 2 μm coherence width is magnified to the modulator plane, the coherent region covers ~410 μm or 3.4 pixels. Thus, the light is coherent enough across any one pixel to be phase modulated by that pixel.

Figure 2:
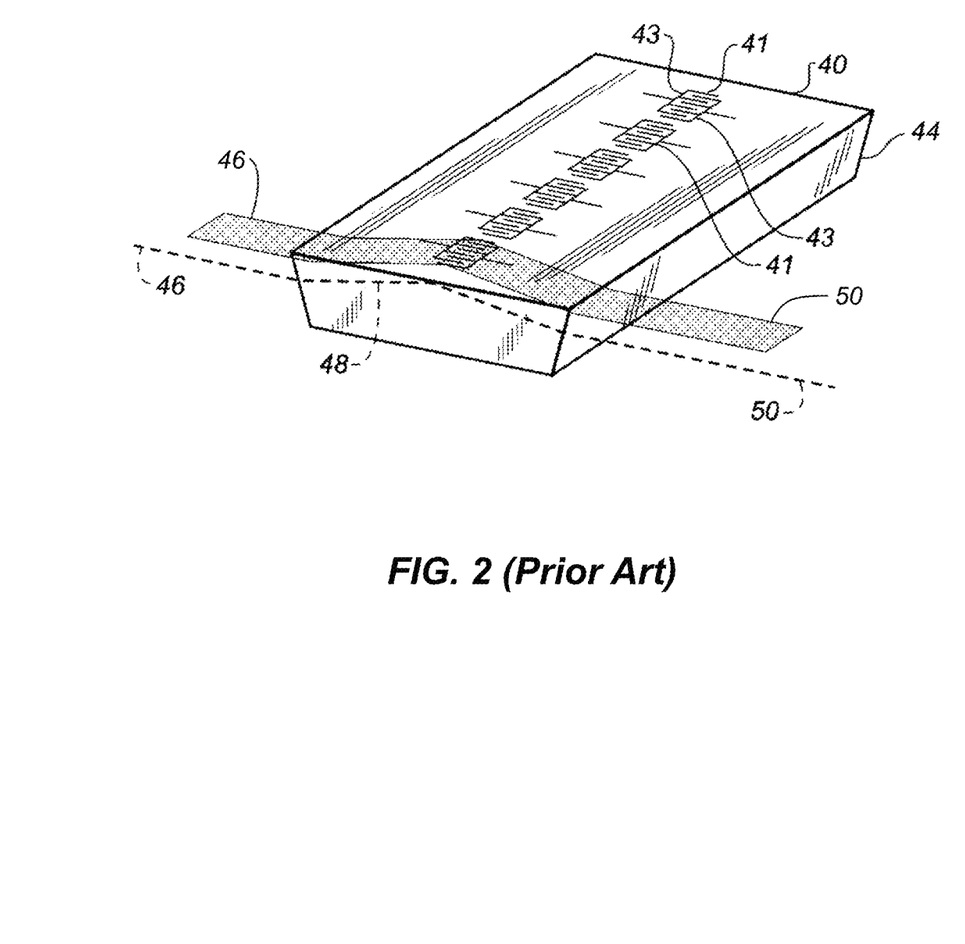
FIG. 2 is a perspective view of an exemplary TIR spatial light modulator.

An exemplary configuration for TIR modulator array 40 (sometimes referred to as a TIR spatial light modulator or a light valve array) is shown in FIG. 2 and discussed in commonly-assigned U.S. Pat. No. 6,211,997 to Nutt et al., entitled "Modulator for optical printing," which is incorporated herein by reference. While only six modulator pixels 41 are shown in FIG. 2 for clarity, in an exemplary configuration, the TIR modulator array 40, includes 256 modulator pixels 41 arranged linearly, with each pixel having a defined width of 120 μm, so that the TIR modulator array 40 has a total active length in the array direction of 30.72 mm. Thus, when light from laser diode array 11 (FIG. 1) is imaged onto TIR modulator array 40 to flood illuminate the total active length, the resulting array-direction NA at TIR modulator array 40 is ~0.0122. Each pixel 41 contains a plurality of electrodes 43 that establish an electric field between adjacent electrodes 43. The electric field within each pixel 41 acts as an independent finite phase grating. An incident light beam 46, which covers the width of a modulator pixel 41, is refracted to form a refracted light beam 48 in an electro-optic substrate 44, which undergoes a phase change within the interaction length of an activated modulator pixel 41 such that the resulting output light beam 50 is modulated within the width of an addressed modulator pixel 41. Because the output light beam 50 is minimally coherent in the array direction, the local modulation of the output light beam 50 for one pixel does not strongly interfere in the Fourier plane 85 with the other overlapped pixel Fourier planes. In effect, any filtering in the Fourier plane applies to each independent pixel. This is a key element in the design of this TIR modulator-based printing system. Furthermore, because the initial laser diode emitters 12 in the laser diode array 11 are colinear along the array direction, the constraints of interaction distance and optical cross talk can be reduced. Without the particular method of utilizing substantial incoherence in the array direction presented in this discussion, the effective interaction distance would be reduced, and the modulation depth would be severely compromised. In FIGS. 1 and 2, each modulator pixel 41 is shown spaced apart from each other in an exaggerated manner to more clearly describe the invention. It is recognized that the modulator pixels 41 are closely spaced and are nominally separated from one another by an intra-pixel electro-pitch of about 20 μm.

Figure 3A:
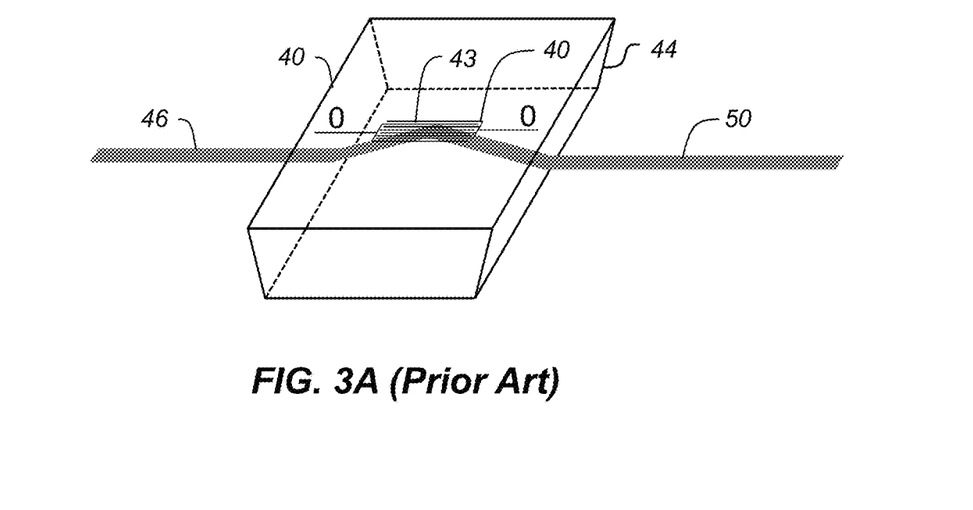
FIG. 3A illustrates a TIR spatial light modulator with an electrically-controlled diffraction grating in a first state where the light beam is undiffracted.
Figure 3B:
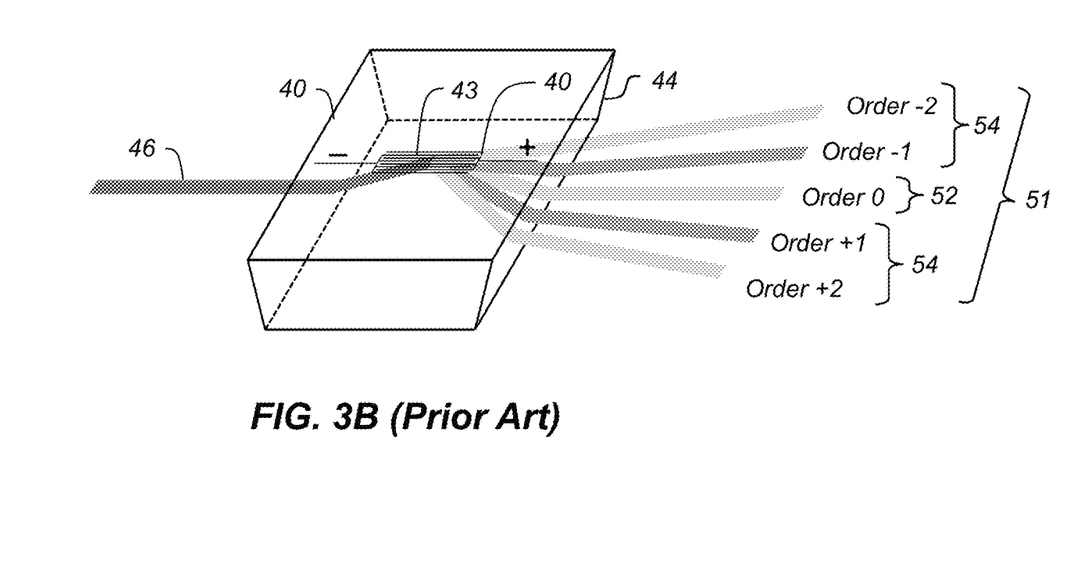
FIG. 3B illustrates a TIR spatial light modulator with an electrically-controlled diffraction grating in a second state where the light beam is diffracted into a plurality of output light beams.

The modulator pixels 41 of the TIR modulator array 40 are electrically-controlled diffraction gratings having two states. FIG. 3A illustrates a first state wherein no voltage is applied across the electrodes 43 of a modulator pixel. In this case, the incident light beam 46 passes through the electro-optic substrate 44 without diffraction providing an undiffracted output light beam 50. FIG. 3B illustrates a second state where a voltage is applied across the electrodes 43 of the modulator pixel forming a phase grating which diffracts the incident light beam 46 into a plurality of output light beams 51 corresponding to different diffraction orders, the plurality of output light beams 51 including a zero-order light beam 52 corresponding to a zero diffraction order, and a plurality of diffracted light beams 54 having various diffraction orders. The number of diffracted light beams 54 that are formed and the amount of energy in each of the output light beams 51 will depend on the characteristics of the phase grating (e.g., grating period and phase profile), together with the angle of incidence and wavelength of the incident light beam 46, and properties of the electro-optic substrate 44 (e.g., the index of refraction).

A weakness with the configuration described in FIGS. 1-2 is that it suffers from a relative high level of light leakage. This results from the fact that when a pixel is in an "off" state, the grating formed when a voltage is applied to the light valve channel diffracts the majority of the light beam so that it does not pass through the slit, but a small fraction of the light beam is undiffracted so that it still passes through the light valve without deflection (i.e., in the zero diffraction order), and is therefore imaged onto the image plane. This undesired light is called "leakage," and with this type of design is typically in the range of 1-4%, but can be substantially higher when the grating period is reduced in order to improve resolution or increase the number of pixels. For example, a leakage value of about 8% has been observed with a 20 μm grating period. The leakage limits the contrast of the image produced by the laser exposure system 10 and can result in imaging artifacts.

An alternate approach proposed in U.S. Pat. No. 6,169,565 is to use a modified spatial filter that passes the diffracted light rather than the undiffracted light. In this case the "on" state will correspond to the state where the grating in the modulator pixel 41 is activated. While this can significantly improve the leakage performance of the laser exposure system 10, it has a number of disadvantages. If the modified spatial filter passes only a single diffraction order (e.g., the +1 diffraction order), then there will be a significant power loss relative to the case where the undiffracted light is used as the imaging light. If the modified spatial filter includes a plurality of apertures to pass multiple diffraction orders (e.g., the +1 and −1 diffraction orders), the power level can be improved, but not without other tradeoffs. In particular, the optical elements downstream from the spatial filter 90 (e.g., print lens element 83) must combine the different diffraction orders to focus them onto the image plane 100. This would require the optical elements to be large enough to capture the light from the multiple diffraction orders which will increase the cost relative to systems which only need to image the undiffracted light beam. Furthermore, because of the large angles between the combined light beams, the depth of focus would be drastically reduced. It will also lead to an interference pattern distorting light spots intended for imaging.

Figure 4:
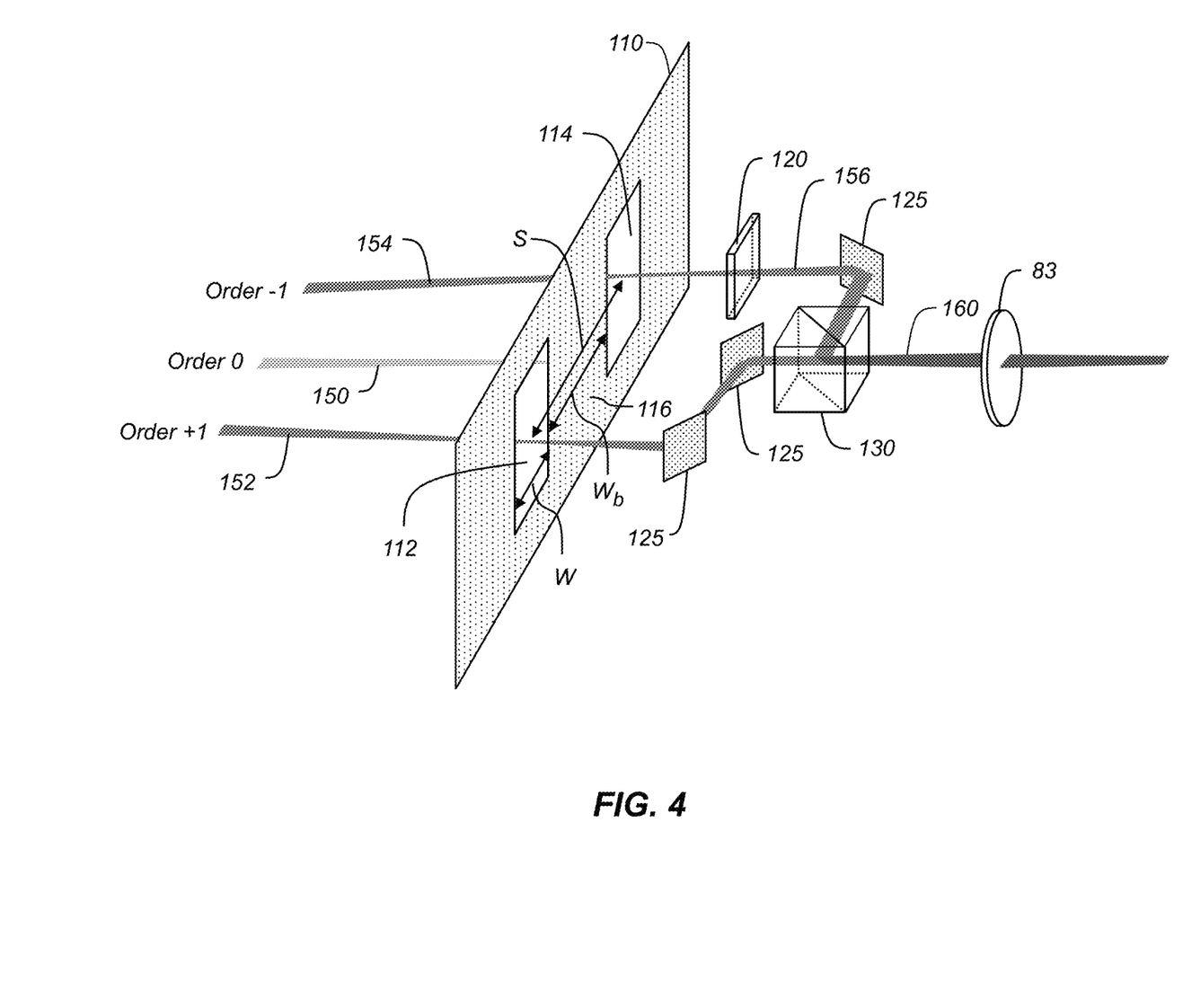
FIG. 4 illustrates components of an improved laser exposure system in accordance with an exemplary embodiment.

The present invention represents an improved laser exposure system that has a significantly lower leakage level while maintaining a high power level and a large depth of focus. The improved laser exposure system will now be described with reference to FIG. 4. The elements shown in FIG. 4 are adapted to replace the spatial filter 90 and the print lens element 83 in the prior art arrangement shown in FIG. 1. In particular, the spatial filter 90 with a slit 91 that passes the undiffracted light (i.e., the zero diffraction order) is replaced by an aperture structure 110 with a light blocking portion 116 that blocks the zero-order light beam 150 and first and second apertures 112, 114 that pass first and second diffracted light beams 152, 154, respectively. In an exemplary embodiment, the apertures 112, 114 have a width W which is substantially equal to one half the separation S between the centroids of the first and second order diffracted light beams 152, 154 in the plane of the aperture structure 110. In this case, the width $W_b$ of the light blocking portion 116 will also be substantially equal to W (assuming that the first and second order diffracted light beams 152, 154 pass through the center of the apertures 112, 114). Within the context of the present invention, "substantially equal" should be interpreted to mean equal to within ±10%. In other embodiments, the widths W of the apertures 112, 114 do not need to be equal, and do not have to be equal to the width $W_b$ of the light blocking portion 116 so long as the apertures 112, 114 pass the first and second diffracted light beams 152, 154 and block the zero-order light beam 150.

Note that while the aperture structure 110 of FIG. 4 is shown in the form of an aperture plate having two apertures 112, 114 and a central light blocking portion 116, this arrangement is not limiting. For example, it is not required that the apertures 112, 114 be openings that are fully enclosed within an aperture plate. The only requirement is that the aperture structure passes the first and second diffracted light beams 152, 154 while blocking the zero-order light beam 150. Any aperture structure 110 that satisfies this requirement should be considered to be within the scope of the present invention. For example, the aperture structure 110 can consist of a simple light blocking structure which is positioned on the optical axis to block the zero-order light beam 150. In this case, the "apertures" 112, 113 will correspond to the unblocked regions to the left and right of the light blocking structure.

The zero-order light beam 150 and the first and second diffracted light beams 152, 154 are provided by the TIR modulator array 40 (FIG. 2) which includes one or more modulator pixels 41. As discussed earlier, the TIR modulator array 40 includes an electro-optic substrate 44 with an electrically-controlled diffraction grating for each modulator pixel 41 having a controllable state. When the electrically-controlled diffraction grating is controlled to be in a first state (i.e., no voltage is supplied to the electrodes 43), the incident light beam 46 passes through the electro-optic substrate 44 without diffraction, providing an undiffracted output light beam 50, which will correspond to the zero-order light beam 150 of FIG. 4. When the electrically-controlled diffraction grating is controlled to be in a second state (i.e., an appropriate voltage is supplied to the electrodes 43), the incident light beam 46 is diffracted into a plurality of light beams corresponding to different diffraction orders. The plurality of light beams include the zero-order light beam 150 and the first and second diffracted light beams 152, 154 of FIG. 4.

Note that the shape and propagation direction of the zero-order light beam 150 and the first and second diffracted light beams 152, 154 will be adjusted by the optical elements between the TIR modulator array 40 and the aperture structure 110 (e.g., print lens elements 81, 82). Also note that the optical elements between the TIR modulator array 40 and the aperture structure 110 are arranged such that the first diffracted light beams 152 from each of the modulator pixels 41 all pass through the first aperture 112, the second diffracted light beams 154 from each of the modulator pixels 41 all pass through the second aperture 114, and the zero-order light beams 150 from each of the modulator pixels 41 are all blocked by light blocking portion 116. Generally, the light beams in a given diffraction order from the different modulator pixels 41 will converge onto the plane of the aperture structure at substantially the same location, but will have different propagation angles.

In a preferred embodiment, the first diffracted light beam 152 corresponds to the +1 diffraction order and the second diffracted light beam 154 corresponds to the −1 diffraction order. In alternate embodiments, the first and second diffracted light beams 152, 154 could correspond to other diffracted orders (e.g., the ±n diffraction orders). However, in order to maximize the power level provided by the laser exposure system 10, it will generally be preferable to use the ±1 diffraction orders. To further maximize the power level in the first and second diffracted light beams 152, 154, it is preferable to design the grating of the modulator pixel 41 such that the only diffraction orders that freely propagate are the zero diffraction order and the ±1 diffraction orders. One skilled in the art will recognize that this can be done by selecting the grating period and angle of incidence of the refracted light beam 48 (FIG. 2) onto the grating such that the ±n diffraction orders with n>1 correspond to surface evanescent waves.

A polarization rotator 120 is placed in the path of the second diffracted light beam 154 to produce a polarization-rotated second diffracted light beam 156. In an exemplary embodiment, the polarization rotator 120 is a half-wave plate, although any other optical elements known in the art that rotate the polarization of a light beam can be used in accordance with the present invention.

A series of mirrors 125 are then used to direct the first diffracted light beam 152 and the polarization-rotated second diffracted light beam 156 into a polarization beam combiner 130. The polarization beam combiner 130 combines the first diffracted light beam 152 and the polarization-rotated second diffracted light beam 156 onto a common path forming a combined light beam 160. In a preferred embodiment, the polarization beam combiner 130 is a well-known cube beamsplitter constructed from two right angle prisms. In other embodiments, the polarization beam combiner 130 can use any other type of beam combiner component known in the art that can be used combine two beams of different polarizations onto a common path such as a plate beamsplitter.

In a preferred embodiment, the mirrors 125 and other optical components are positioned such that the optical path lengths of the first diffracted light beam 152 and the second diffracted light beam 154/polarization-rotated second diffracted light beam 156 are approximately equal. In this way, the beam characteristics of the two beams will be substantially the same at the point where they are combined. Preferably, the optical path lengths should be equal to within the depth of field of the beam bundle from a single pixel of the TIR modulator array 40. More preferably, the optical path lengths should be equal to within one half, or even more preferably to within one quarter, of the depth of field. It can be shown that the depth of field can be approximated by $DOF \approx 2d^2/\lambda$ where d is the grating period of the phase grating, and $\lambda$ is the laser wavelength. Print lens element 83 (which in practice may include a plurality of individual lenses) is used to focus the combined light beam 160 onto the receiver medium 105 at the image plane 100. The focused light beam will include individual exposure spots corresponding to each of the modulator pixels 41. The exposure spots can be turned off and on by using a controller (not shown) to control the electrodes 43 of the electrically-controlled diffraction grating in accordance with pixel data for the corresponding image pixels in an image to be printed by the laser exposure system 10.

The improved laser exposure system of the present invention has the advantage that the combined light beam 160 combines the optical power in the first and second diffracted light beams 152, 154 while maintaining the beam size and propagation angle range of the individual light beams. This provides improved power relative to prior art systems which utilize a single diffracted order to provide the imaging light, and provides improved depth of focus relative to prior art systems that combine multiple diffraction orders to provide the imaging light. Additionally, it provides significantly improved leakage rates relative to the configuration of FIG. 1 which uses the undiffracted light beam as the imaging light. In practice, it has been found that the leakage rate for the improved laser exposure system can be as low as 1.5% in the case of a 20 µm grating period as compared to a value of 8% which is observed in the conventional configuration of FIG. 1.

Figure 5:
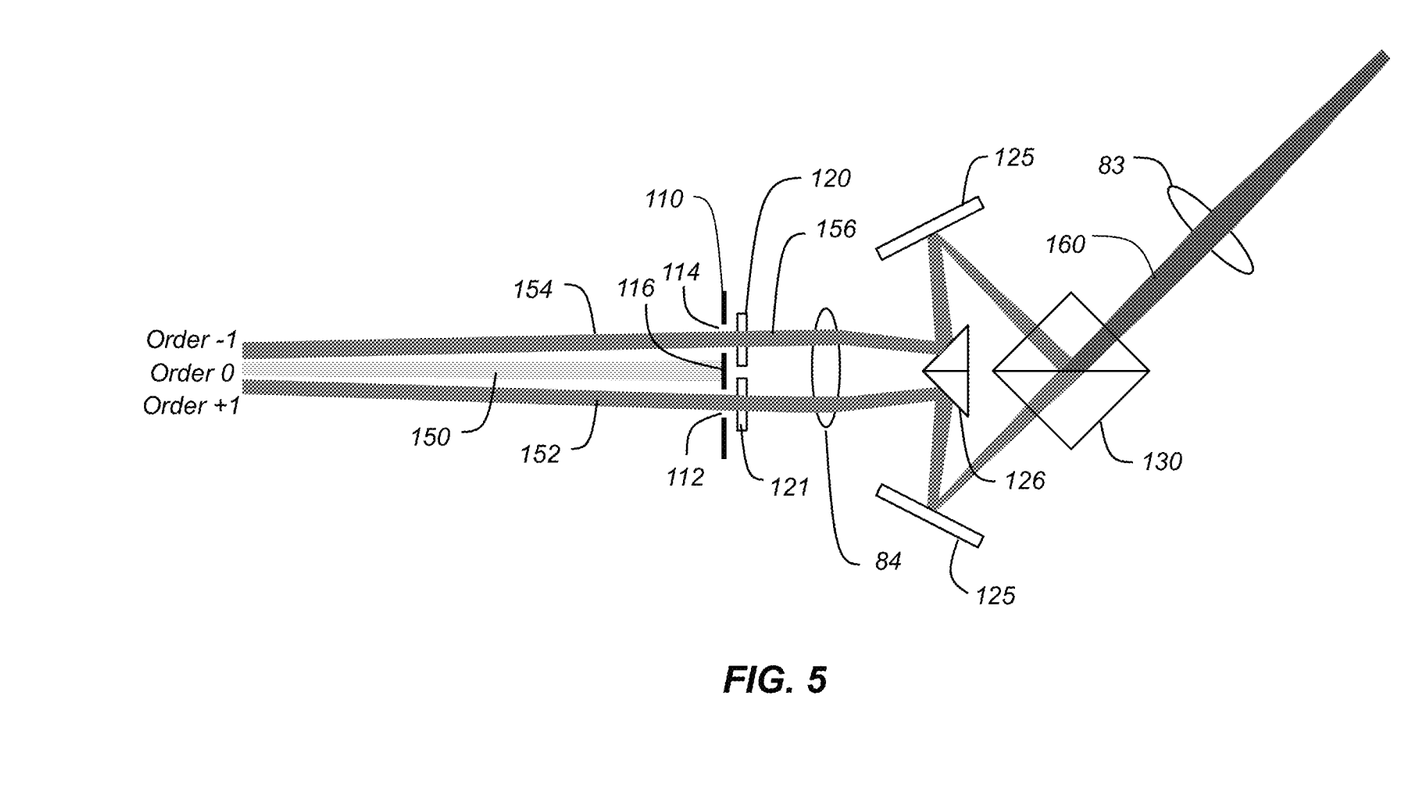
FIG. 5 illustrates components of an improved laser exposure system in accordance with an alternate embodiment.

It will be recognized by those skilled in the art, that the configuration shown in FIG. 4 is just one exemplary embodiment of the present invention, and that a wide variety of different configurations can be used which include the relevant features of the invention. For example, FIG. 5 illustrates an alternate embodiment which is based on the same design principles, but which uses different components to direct the optical paths of the light beams. Notably, the alternate configuration of FIG. 5 includes an aperture structure 110 which includes a light blocking portion 116 which blocks the zero-order light beam and apertures 112, 114 which pass the first and second diffracted light beams 152, 154. A polarization rotator 120 is positioned in the path of second diffracted light beam 154 to provide a polarization-rotated second diffracted light beam 156. A transparent window 121 is positioned in the path of first diffracted light beam 152 which does not impact the polarization of the first diffracted light beam 152, but has a similar impact on the optical path length as the polarization rotator 120. Mirrors 125, together with a prism 126 with reflecting surfaces and a print lens element 84 (which may include a plurality of individual lens elements) are used to direct the light beams into the polarization beam combiner 130, which is used to combine the first diffracted light beam 152 and the polarization-rotated second diffracted light beam 156 onto a common path to provide combined light beam 160. The print lens element 83 (which may include a plurality of individual lens elements) is then used to focus the combined light beam 160 onto the receiver medium 105 (FIG. 1).

The invention has been described in detail with particular reference to certain preferred embodiments thereof, but it will be understood that variations and modifications can be effected within the spirit and scope of the invention.

PARTS LIST 10 laser exposure system
11 laser diode array
12 laser diode emitter
13 optical axis
20 illumination optics
21 fiber lens
24 laser lenslet array
25 combiner field lens
27 cross-array lens
28 field lens
40 TIR modulator array
41 modulator pixel
43 electrode
44 electro-optic substrate 46 incident light beam
48 refracted light beam
50 output light beam
51 output light beams
52 zero-order light beam
54 diffracted light beam
80 print lens
81 print lens element
82 print lens element
83 print lens element
84 print lens element
85 Fourier plane
90 spatial filter
91 slit
100 image plane
105 receiver medium
110 aperture structure
112 aperture
114 aperture
116 light blocking portion
120 polarization rotator
121 window
125 mirror
126 prism
130 polarization beam combiner
150 zero-order light beam
152 first diffracted light beam
154 second diffracted light beam
156 polarization-rotated second diffracted light beam
160 combined light beam

The invention claimed is:

1. A laser exposure system, comprising:
an electro-optic substrate including an electrically-controlled diffraction grating having a controllable state;
a laser source directing an incident light beam into the electro-optic substrate, wherein when the electrically-controlled diffraction grating is controlled to be in a first state the incident light beam passes through the electro-optic substrate without diffraction providing an undiffracted light beam, and wherein when the electrically-controlled diffraction grating is controlled to be in a second state the incident light beam is diffracted into a plurality of light beams corresponding to different diffraction orders, the plurality of light beams including a zero-order light beam corresponding to a zero diffraction order, and first and second diffracted light beams corresponding to diffraction orders of −n and +n;
an aperture structure including first and second apertures positioned such that the first diffracted light beam passes through the first aperture and the second diffracted light beam passes through the second aperture, wherein the aperture plate blocks the undiffracted light beam when the electrically-controlled diffraction grating is in the first state and blocks the zero-order light beam when the electrically-controlled diffraction grating is in the second state;
a polarization rotator which rotates a polarization state of the second diffracted light beam to provide a polarization-rotated second diffracted light beam;
a polarization beam combiner which combines the first diffracted light beam and the polarization-rotated second diffracted light beam onto a common path forming a combined light beam;
a print lens which focuses the combined light beam onto an imaging medium; and
a controller which controls the state of the electrically-controlled diffraction grating in accordance with pixel data.

2. The laser exposure system of claim 1, wherein a period of the electrically-controlled diffraction grating is selected such that the plurality of light beams includes only the zero-order light beam corresponding to the zero diffraction order, and first and second diffracted light beams corresponding to diffraction orders of −1 and +1.

3. The laser exposure system of claim 1, wherein an angle of incidence of the incident light beam onto the electrically-controlled diffraction grating is selected such that the plurality of light beams includes only the zero-order light beam corresponding to the zero diffraction order, and first and second diffracted light beams corresponding to diffraction orders of −1 and +1.

4. The laser exposure system of claim 2, wherein a width of the first and second apertures is substantially equal to half of a separation between the first and second diffracted light beams in a plane of the aperture structure.

5. The laser exposure system of claim 1, wherein the electro-optic substrate includes a plurality of electrically-controlled diffraction grating which are independently controllable in accordance with pixel data for different image pixels.

6. The laser exposure system of claim 5, wherein the first diffracted light beams from each of the electrically-controlled diffraction gratings all pass through the first aperture, the second diffracted light beams from each of the electrically-controlled diffraction gratings all pass through the second aperture, and the zero-order light beams from each of the electrically-controlled diffraction gratings are all blocked by aperture structure.

7. The laser exposure system of claim 1, wherein the polarization rotator is a half-wave plate.

8. The laser exposure system of claim 1, wherein the polarization beam combiner is a cube beamsplitter constructed using two right angle prisms.

9. The laser exposure system of claim 1, wherein optical path lengths between the electrically-controlled diffraction grating and the polarization beam combiner for the first and second light beams differ by no more than $2d^2/\lambda$ where d is a grating period of the diffraction grating and $\lambda$ is a wavelength of the light beam from the laser source.

* * * * *